(12) United States Patent
Van Drie

(10) Patent No.: US 8,133,386 B1
(45) Date of Patent: Mar. 13, 2012

(54) BIOLOGICAL WASTE DIGESTER AND METHOD OF OPERATION

(76) Inventor: Gerhardt Van Drie, El Segundo, CA (US)

( * ) Notice: Subject to any disclaimer, the term of this patent is extended or adjusted under 35 U.S.C. 154(b) by 0 days.

(21) Appl. No.: 13/071,006

(22) Filed: Mar. 24, 2011

Related U.S. Application Data

(60) Provisional application No. 61/461,432, filed on Jan. 18, 2011.

(51) Int. Cl.
*B01D 33/70* (2006.01)
*B01F 13/02* (2006.01)

(52) U.S. Cl. ........ 210/150; 210/765; 210/145; 210/219; 210/220; 366/102; 366/276; 366/279; 366/308

(58) Field of Classification Search ................. 366/102, 366/276, 279, 292, 308; 210/150, 765, 145, 210/219, 220
See application file for complete search history.

(56) References Cited

U.S. PATENT DOCUMENTS

| | | | |
|---|---|---|---|
| 2,499,816 A * | 3/1950 | Carter, Jr. ................ | 210/513 |
| 2,715,099 A * | 8/1955 | Stuart ...................... | 210/219 |
| 2,784,150 A * | 3/1957 | Rose et al. ............... | 202/175 |
| 3,466,866 A * | 9/1969 | Eschenfeld ............... | 60/496 |
| 3,788,616 A * | 1/1974 | Clough, Jr. .............. | 261/64.1 |
| 4,054,031 A * | 10/1977 | Johnson ................... | 60/496 |
| 5,762,418 A * | 6/1998 | Van Drie .................. | 366/332 |
| 6,029,955 A * | 2/2000 | Drie ......................... | 261/64.5 |
| 6,036,357 A * | 3/2000 | Van Drie .................. | 366/332 |
| 6,322,056 B1 * | 11/2001 | Drie ......................... | 261/81 |
| 6,554,259 B2 * | 4/2003 | Van Drie .................. | 261/81 |
| 6,599,426 B2 * | 7/2003 | Drie ......................... | 210/629 |
| 6,926,437 B2 * | 8/2005 | Drie ......................... | 366/335 |
| 7,083,324 B2 * | 8/2006 | Van Drie .................. | 366/335 |

* cited by examiner

*Primary Examiner* — Chester Barry
(74) *Attorney, Agent, or Firm* — Gene Scott; Patent Law & Venture Group

(57) ABSTRACT

A method of mixing liquid waste material in a digester tank by extending a supporting beam between opposing walls of the tank, securing a paddle to the supporting beam, fixturing the paddle for rotation about the supporting beam, securing a pair of inflatable air sacks to the paddle at opposing ends, and selectively inflating and deflating the sacks to force the paddle to tilt in cyclic motion thereby mixing the liquid waste containing bacteria, waste material, and oxygen uniformly throughout the digester tank.

19 Claims, 4 Drawing Sheets

BIOLOGICAL WASTE DIGESTER AND METHOD OF OPERATION

This application claims priority of provisional patent application Ser. No. 61/461,432 filed on Jan. 18, 2011, and which is hereby incorporated herein in its entirety.

BACKGROUND

The present disclosure relates to the field of large-scale water treatment, and more particularly to the treatment of aqueous borne waste from municipal, commercial and industrial operations; but is not limited thereto. In my prior issued patents: U.S. Pat. No. 5,762,418, U.S. Pat. No. 6,029,955, U.S. Pat. No. 6,036,357, U.S. Pat. No. 6,322,056, U.S. Pat. No. 6,554,259, U.S. Pat. No. 6,599,426, U.S. Pat. No. 6,926,437, and U.S. Pat. No. 7,083,324, I define apparatus and methods for treating sludge and other materials. The present invention extends this body of knowledge and particularly applies the utilization of the combination of gravity and buoyancy to assist where mixing is required in waste digesters.

SUMMARY

The present description defines an apparatus and a method of using the apparatus for mixing liquid waste material in a biological digester tank where the mixing action occurs by tilting a paddle using air sacks in order to produce a cyclic motion within the waste material. In one aspect of the apparatus, the paddle is mounted on a rotating beam spanning the tank so that it is free to move in tilting motion. In another aspect of the apparatus, inflatable sacks are mounted on the paddle so that that they are submerged within the liquid waste. In another aspect of the apparatus, an air supply is used to inflate and simultaneously deflate the opposing sacks in turn to raise opposing ends of the paddle by buoyancy and gravity forces thereby causing fluid mixing action. In a still further aspect of the apparatus a channel is created below the paddle in order to force motion of the waste material horizontally to lengthen its contact time with digester bacteria for improving the efficiency of the digester. These and other aspects may, in various implementations, provide advantages such as: small installation investment, low energy usage in mixing large amounts of waste matter, simplistic operation for reduced recurring maintenance costs, fully automated operation, improved digester efficiency by extending the contact time between digester agents and waste matter, and improved oxygen exposure to digester aerobic bacteria.

The details of one or more embodiments of these concepts are set forth in the accompanying drawings and the description below. Other features, objects, and advantages of these concepts will be apparent from the description and drawings, and from the claims.

DESCRIPTION OF DRAWINGS

Like reference symbols in the various drawings indicate like elements.

DETAILED DESCRIPTION

Figure 1:
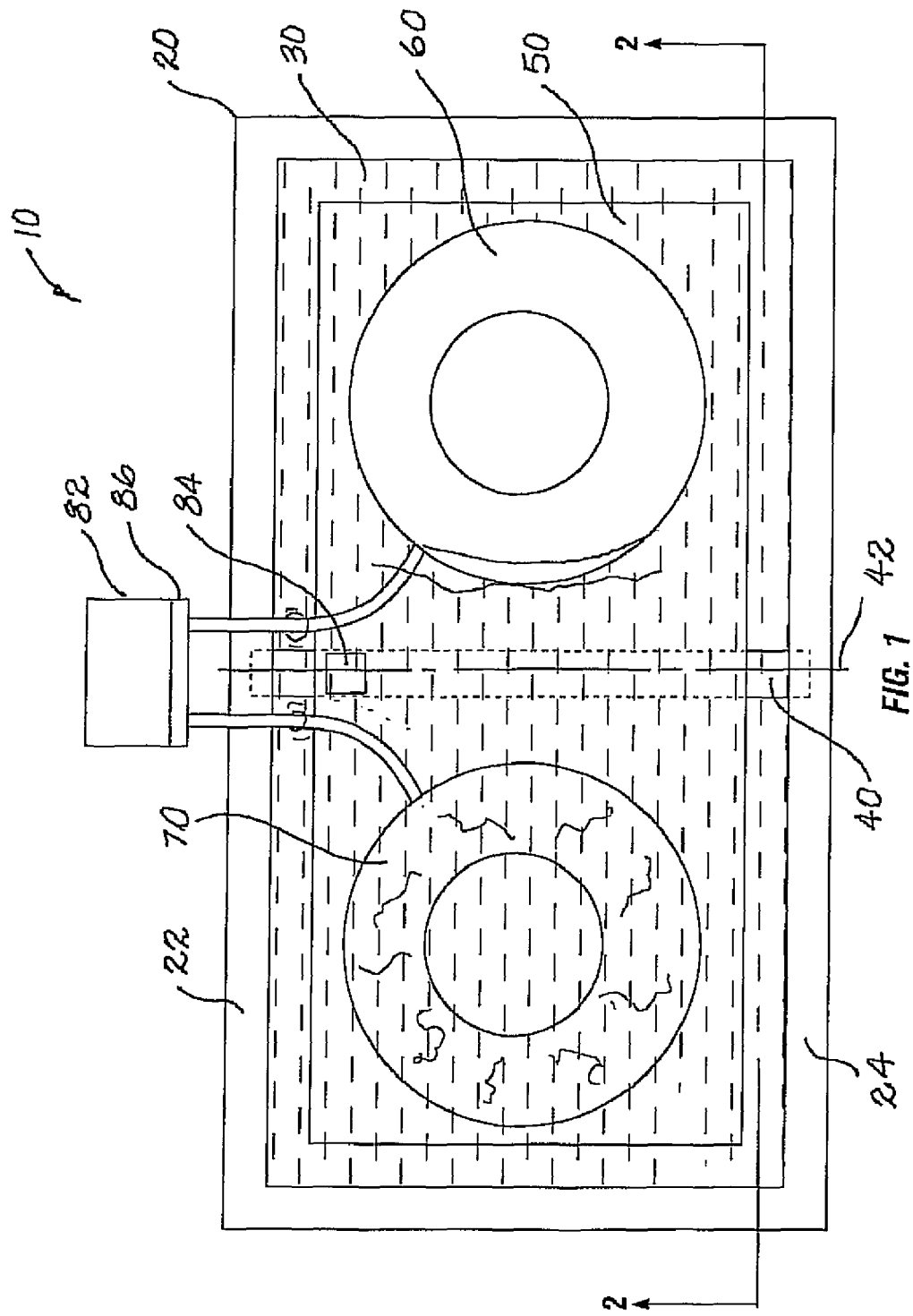
FIG. 1 is a plan view of an example of the presently described apparatus.

FIG. 1 is a plan view of the presently disclosed apparatus, a liquid waste digester 10. Digester 10 uses a tank 20 for receiving a liquid waste solution 30 which may be pumped into tank 20 in a batch or continuous in-out process. Inlet and outlet pipes are not shown in FIG. 1, but those of skill would know how to apply such facilitation. A supporting beam 40 extends between opposing walls 22 and 24 of tank 20, and beam 40 is supported for rotation about its own longitudinal axis 42 by bearings or other low friction mountings (not shown) within walls 22 and 24.

A paddle 50 is secured in any manner whatsoever, to the supporting beam 40 and is thereby also enabled for rotation about the longitudinal axis 42 of the supporting beam 40. A pair of inflatable air sacks 60 and 70 are secured to paddle 50 on its up-facing surface and may be positioned in equally spaced-apart locations on opposing sides of beam 40 as clearly illustrated in FIG. 1. The paddles 50 may also be supported by structure from the bottom of the tank 20.

A means 80 (FIG. 4) for selectively inflating sacks 60 and 70 is provided and may include an air pump 82 and a tilt switch 84 as shown in FIG. 1. The tilt switch 84, which may be a simple mercury vial with contacts at opposite ends, may be mounted on paddle 50 and may be electrically interconnected with a solenoid valve operator 86, whereby tilting of the paddle 50 controls air flow from the air pump 82 into a selected one of the air sacks 60 or 70 at any one time. Preferably, two solenoids may be used to control the direction of air flow between the inflatable sacks 60 and 70.

Figure 2:
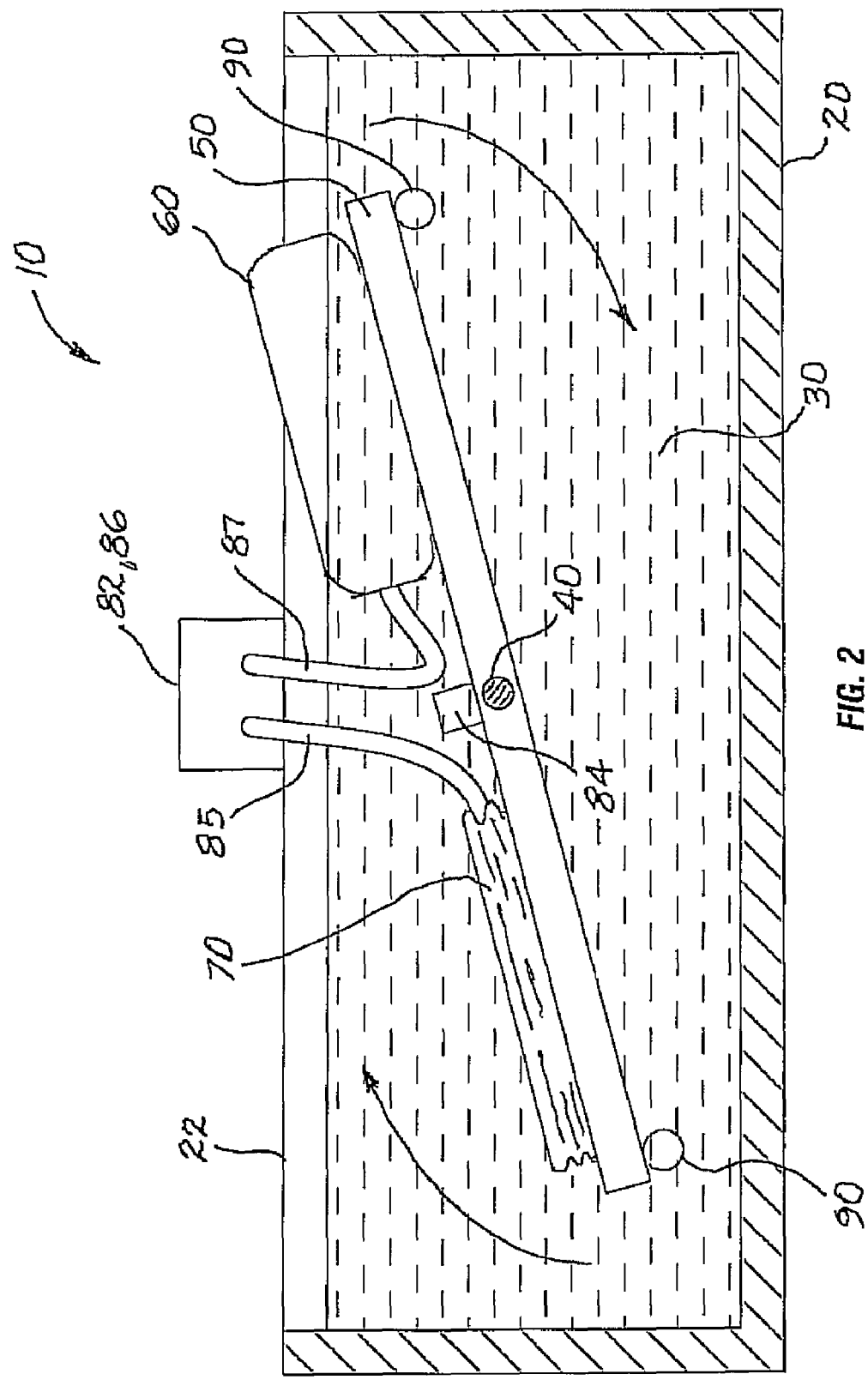
FIGS. 2 and 3 are elevational section views taken along line 2-2 in FIG. 1 demonstrating each half of a cycle of the present method.

The inflatable air sacks 60 and 70 may be, for instance, truck tire inner tubes or other large volume inflatables and their attachment to paddle 50 may be by adhesives or common mechanical holders as would be known by those of skill in the mechanical arts. Weights 90 may be secured to the paddle 50 as shown in FIGS. 2 and 3 in order to improve the utilization of gravitational forces, as will be described in the process described below.

Figure 3:
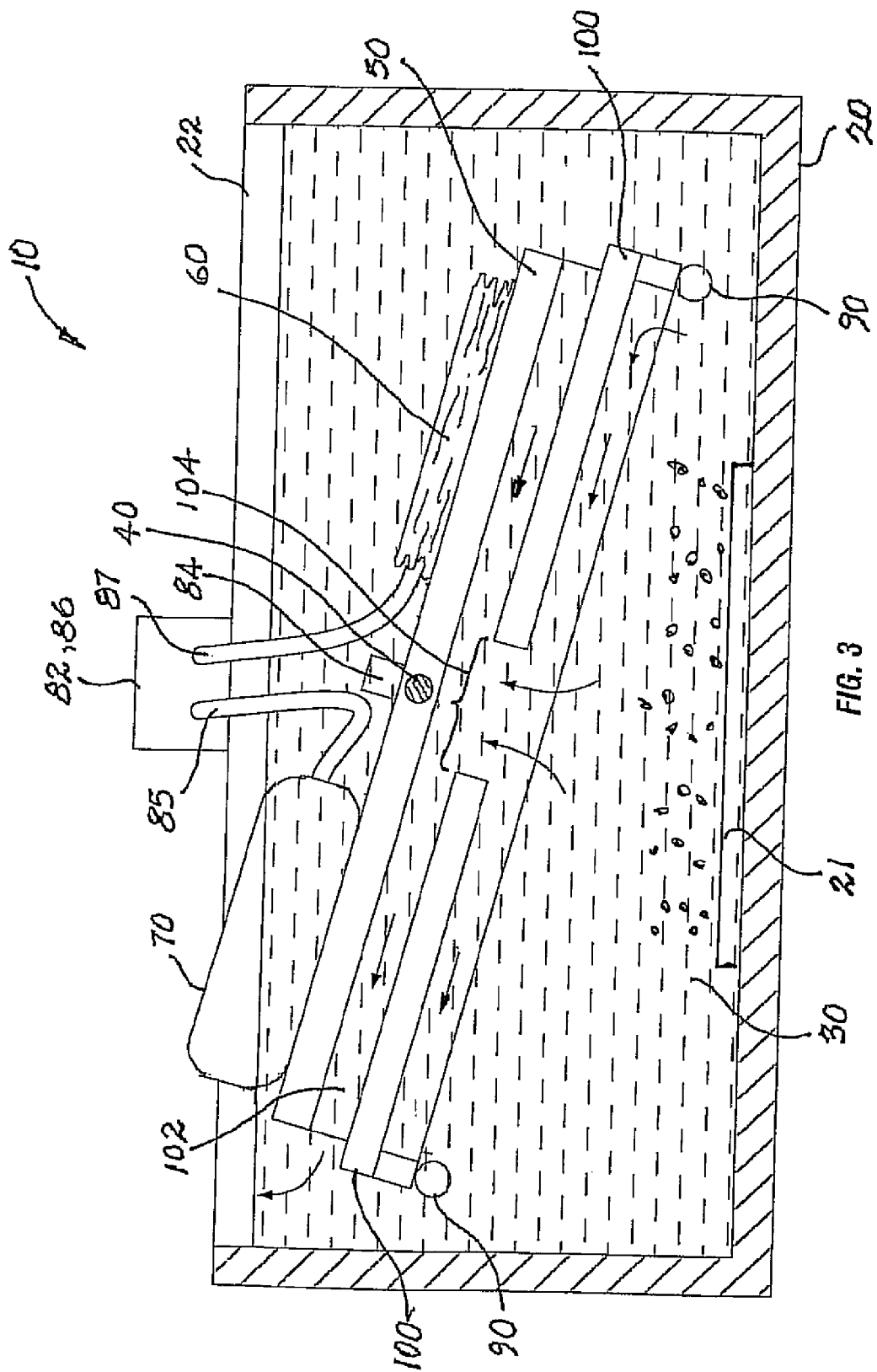

In an improved embodiment of the present apparatus, as shown in FIG. 3, a channel board 100 may be secured in a position parallel to, and spaced apart, from paddle 50 thereby defining a channel 102 therebetween. The channel board 100 may have a medially positioned gateway 104 which utilization will be described below. Gateway 104 may comprise one or more spaced apart openings in channel board 100, or may fully split board 100 into two or more spaced apart sections as shown. Gateway 104 may be positioned in alignment with beam 40. The apparatus shown in FIG. 1 shows a relatively small tank 20 and paddle 50 with only two inflatable sacks 60 and 70. However, the tank 20 may be larger, as for instance, extending over a length of 100 feet or more and the paddle 50 may have plural sets of sacks 60 and 70, or plural paddles 50 with apparatus may be applied to tank 20.

It is well known in the art of biological waste digesters, that in order for bacteria to efficiently digest waste matter, the solution 30 which carries the waste matter must be mixed in order to bring bacteria into intimate contact with the waste uniformly throughout the volume of the digester 10. In the presently described digester 10, tank 20 is filled to a selected level with solution 30 and paddle 50 is tilted first in one rotational direction as shown in FIG. 2, and then in the opposite rotational direction as shown in FIG. 3. This alternate tilting of paddle 50 may be a continuous repeating cycle, a timed repeating cycle, or any combination of these. The unlabeled arrows shown in the tank 20 of FIGS. 2 and 3 indicate the direction of flow of the solution 30. As the paddle end at the right side of tank 20 in FIG. 2 moves up, it causes the solution 30 to be displaced downwardly and as the paddle end at the left side of tank 20 moves down, it displaces the solution 30 upwardly. This recurring alternate tilting of paddle 50 causes such agitation and mixing of the solution 30 that it assures contact between the bacteria and the waste matter in solution 30. In FIG. 3, the same mixing occurs as in FIG. 2, but the channel 102 forces the bacteria to have a longer contact time with the waste matter and oxygen in solution 30 as it is forced through channel 102, which improves the rate of digestion, i.e., efficiency of the operation. Also shown in FIG. 3 is a diffuser 21 at the bottom of tank 20 which is used to bubble oxygen into the solution 30.

The paddle 50 is tilted back and forth by first inflating one of the two air sacks 60 and 70 while deflating the other one of the sacks. This causes the end of the paddle 50 with the inflated one of the sacks to rise due to buoyancy forces while the other end of paddle 50 drops by gravity as shown in FIG. 2 since buoyancy forces are minimized. This portion of the tilting cycle stops when the inflated one of the sacks rises out of the surface of solution alignment with beam 40. The apparatus shown in FIG. 1 shows a relatively small tank 20 and paddle 50 with only two inflatable sacks 60 and 70. However, the tank 20 may be larger, as for instance, extending over a length of 100 feet or more and the paddle 50 may have plural sets of sacks 60 and 70, or plural paddles 50 with apparatus may be applied to tank 20.

It is well known in the art of biological waste digesters, that in order for bacteria to efficiently digest waste matter, the solution 30 which carries the waste matter must be mixed in order to bring bacteria into intimate contact with the waste uniformly throughout the volume of the digester 10. In the presently described digester 10, tank 20 is filled to a selected level with solution 30 and paddle 50 is tilted first in one rotational direction as shown in FIG. 2, and then in the opposite rotational direction as shown in FIG. 3. This alternate tilting of paddle 50 may be a continuous repeating cycle, a timed repeating cycle, or any combination of these. The unlabeled arrows shown in the tank 20 of FIGS. 2 and 3 indicate the direction of flow of the solution 30. As the paddle end at the right side of tank 20 in FIG. 2 moves up, it causes the solution 30 to be displaced downwardly and as the paddle end at the left side of tank 20 moves down, it displaces the solution 30 upwardly. This recurring alternate tilting of paddle 50 causes such agitation and mixing of the solution 30 that it assures contact between the bacteria and the waste matter in solution 30. In FIG. 3, the same mixing occurs as in FIG. 2, but the channel 102 forces the bacteria to have a longer contact time with the waste matter and oxygen in solution 30 as it is forced through channel 102, which improves the rate of digestion, i.e., efficiency of the operation. Also shown in FIG. 3 is a diffuser 21 at the bottom of tank 20 which is used to bubble oxygen into the solution 30.

The paddle 50 is tilted back and forth by first inflating one of the two air sacks 60 and 70 while deflating the other one of the sacks. This causes the end of the paddle 50 with the inflated one of the sacks to rise due to buoyancy forces while the other end of paddle 50 drops by gravity as shown in FIG. 2 since buoyancy forces are minimized. This portion of the tilting cycle stops when the inflated one of the sacks rises out of the surface of solution 30 due to a drop in buoyancy force. The digester 10 is configured such that the inflated one of the sacks will stop rising prior to the lower end of the paddle 50 striking the bottom of tank 20. Next, the submerged sack is inflated and the exposed sack is deflated causing the submerged one of the sacks to rise due to buoyancy forces. This alternating rising and falling of the two sacks 60 and 70 may be a continuous sequence. Because the tilting is driven by buoyancy and gravity, relatively little energy is required. It takes much less energy to inflate and deflate the sacks 60 and 70 with air than it would take to drive the paddle 50 directly by mechanical means through its cycles of tilting back and forth.

Figure 4:
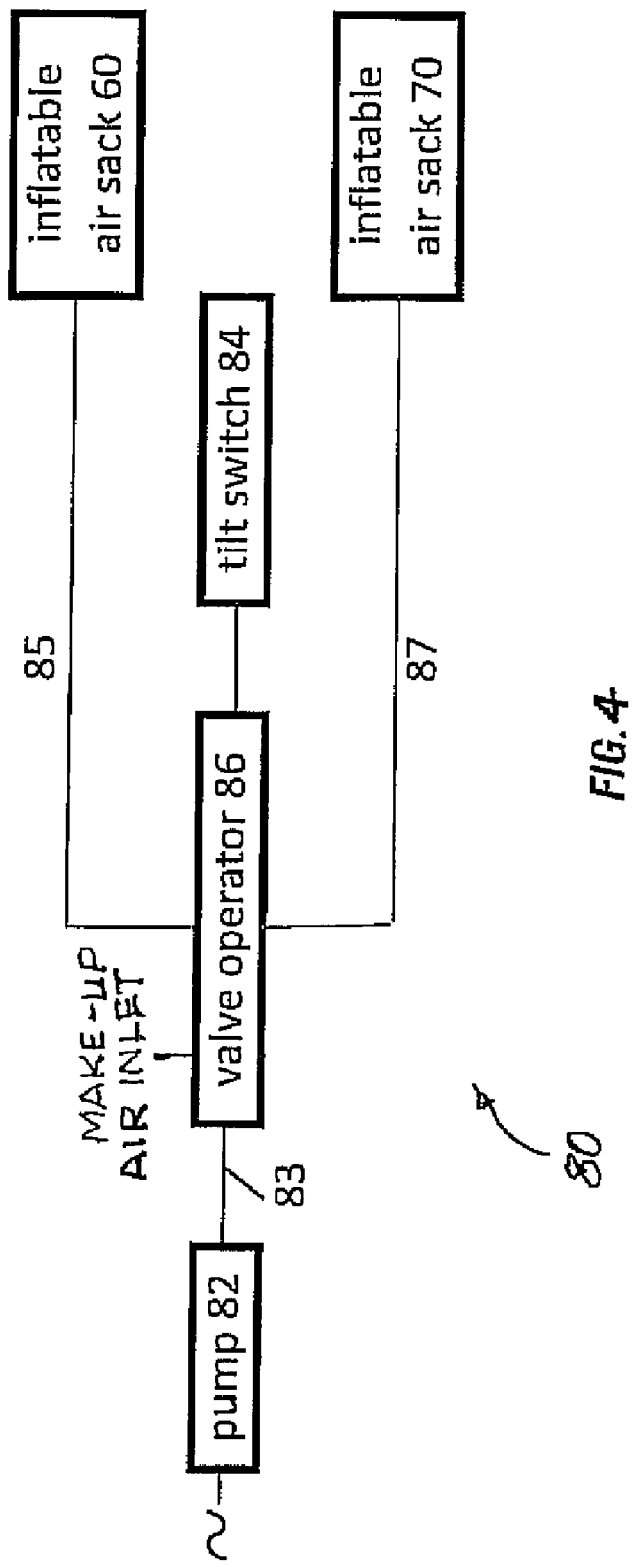
FIG. 4 is a schematic diagram showing the relationship between elements of the apparatus as used for enabling buoyancy distribution.

FIG. 4 is a schematic diagram of the means by which the alternating inflations and deflations are produced. Pump 82 is an air pump driven by a small electrical motor. A conduit 83 connects the pump 82 with solenoid valve operator 86 which is made up of a pair of separate electrically driven valves (not shown) capable of directing air flow from conduit 83 into either conduit 85 or 87 and at the same time respectively venting conduits 87 or 85. Therefore, when operator 86 directs air from pump 82 into conduit 85 to inflate sack 60, it also vents conduit 87 and sack 70. At a selected raised position of sack 60, operator 86 vents conduit 85 and sack 60 while enabling air flow into conduit 87 and sack 70. Tilt switch 84 delivers an electrical control voltage to operator to operate its valves 86 depending on the angle of paddle 50.

A number of embodiments have been described. Nevertheless, it will be understood that various modifications may be made without departing from the spirit and scope of this disclosure. Accordingly, other embodiments are within the scope of the following claims.

What is claimed is:

1. A waste digester apparatus comprising:
   a tank for receiving liquid waste, the tank having opposing walls;
   a supporting beam extending between the opposing walls of the tank, the supporting beam enabled for rotation about a longitudinal axis thereof;
   a paddle secured to the supporting beam and thereby enabled for rotation about the longitudinal axis of the supporting beam;
   a pair of inflatable air sacks secured to the paddle, the sacks positioned on opposing sides of the supporting beam; and
   a means for both inflating and deflating the sacks based upon orientation of the paddle.

2. The apparatus of claim 1 wherein the means for both inflating and deflating the sacks has an air pump and a tilt switch.

3. The apparatus of claim 2 wherein the tilt switch is electrically interconnected with a valve operator, whereby tilting of the paddle controls air flow from the air pump into a selected one of the air sacks.

4. The apparatus of claim 1 wherein the inflatable sacks are inner tubes.

5. The apparatus of claim 1 wherein weights are secured to the paddle in opposing positions relative to the supporting beam for improved gravity effect.

6. The apparatus of claim 1 further comprising a channel board secured in a position spaced apart from the paddle and below the paddle.

7. The apparatus of claim 6 wherein the paddle and the channel board define a channel therebetween.

8. The apparatus of claim 6 wherein the channel board has a medially positioned gateway.

9. A method of mixing liquid waste material comprising:
   filling a tank with the liquid waste material;
   extending a supporting beam between opposing walls of the tank, the supporting beam enabled for rotation about a longitudinal axis thereof;
   securing a paddle to the supporting beam and enabling the paddle for rotation about the longitudinal axis of the supporting beam;

securing a pair of inflatable air sacks to the paddle at opposing ends of the supporting beam; and selectively and alternately inflating and deflating the sacks thereby forcing the paddle to tilt in cyclic motion.

10. The method of claim 9 further comprising electrically interconnecting a tilt switch with a solenoid valve operator and pumping air into a selected one of the air sacks based on paddle tilt as determined by the tilt switch.

11. The method of claim 9 further securing weights to the paddle in opposing positions relative to the supporting beam.

12. The method of claim 9 further comprising securing a channel board to the paddle in a position spaced apart from the paddle, thereby securing a channel therebetween.

13. The method of claim 12 further comprising forming a medially positioned gateway in the channel board.

14. The method of claim 9 further comprising positioning the paddle and a surface of the liquid waste material so that when one of the air sacks extends through the surface, the opposing end of the paddle is spaced apart from a bottom surface of the tank.

15. A method of mixing liquid waste material comprising: in a cyclic repetitive treatment, inflating one air sack mounted on one end of a paddle while deflating another air sack mounted on another end of the paddle, the paddle moving in seesaw motion, thereby alternately elevating and depressing said ends of the paddle in reversing arcuate paths through the liquid waste material.

16. The method of mixing of claim 15 further comprising controlling the inflating and deflating by a tilt sensor secured to the paddle.

17. The method of mixing of claim 15 further comprising the step of bubbling oxygen into the tank for oxygenating the waste material.

18. The method of mixing of claim 17 wherein the oxygen is introduced through a diffuser.

19. The method of mixing of claim 17 wherein bubbles of oxygen are directed into lateral movements thereby extending contact time between the bubbles and liquid waste material.

* * * * *